(12) United States Patent
Beckwith

(10) Patent No.: US 6,411,913 B1
(45) Date of Patent: Jun. 25, 2002

(54) SYNCHRONOUS EXTREMELY LOW FREQUENCY (ELF) RECEIVER

(76) Inventor: Robert W. Beckwith, 2794 Camden Rd., Clearwater, FL (US) 33759

( * ) Notice: Subject to any disclaimer, the term of this patent is extended or adjusted under 35 U.S.C. 154(b) by 0 days.

(21) Appl. No.: 10/025,520

(22) Filed: Dec. 18, 2001

Related U.S. Application Data

(63) Continuation-in-part of application No. 09/286,068, filed on Apr. 5, 1999.
(60) Provisional application No. 60/083,315, filed on Apr. 28, 1998.

(51) Int. Cl.$^7$ ............................................. G01R 19/00
(52) U.S. Cl. ............................................ 702/65; 361/79
(58) Field of Search ................................. 702/65, 64, 2; 367/135, 117; 324/303; 700/293; 361/79, 86

(56) References Cited

U.S. PATENT DOCUMENTS

| | | | | |
|---|---|---|---|---|
| 5,491,716 A | * | 2/1996 | Bond | 375/130 |
| 5,544,064 A | * | 8/1996 | Beckwith | 700/293 |
| 5,814,988 A | * | 9/1998 | Itskovich et al. | 324/303 |

* cited by examiner

Primary Examiner—Kamini Shah
(74) Attorney, Agent, or Firm—Leo J. Aubel

(57) ABSTRACT

An extremely low frequency (ELF) receiver that operates at the 6 Hz to 9 Hz range to synchronously receive signals from the electric (E) field or the magnetic (H) field of the earth's resonant (TS) frequency and other signals of interest.

14 Claims, 1 Drawing Sheet

ELF RECEIVER

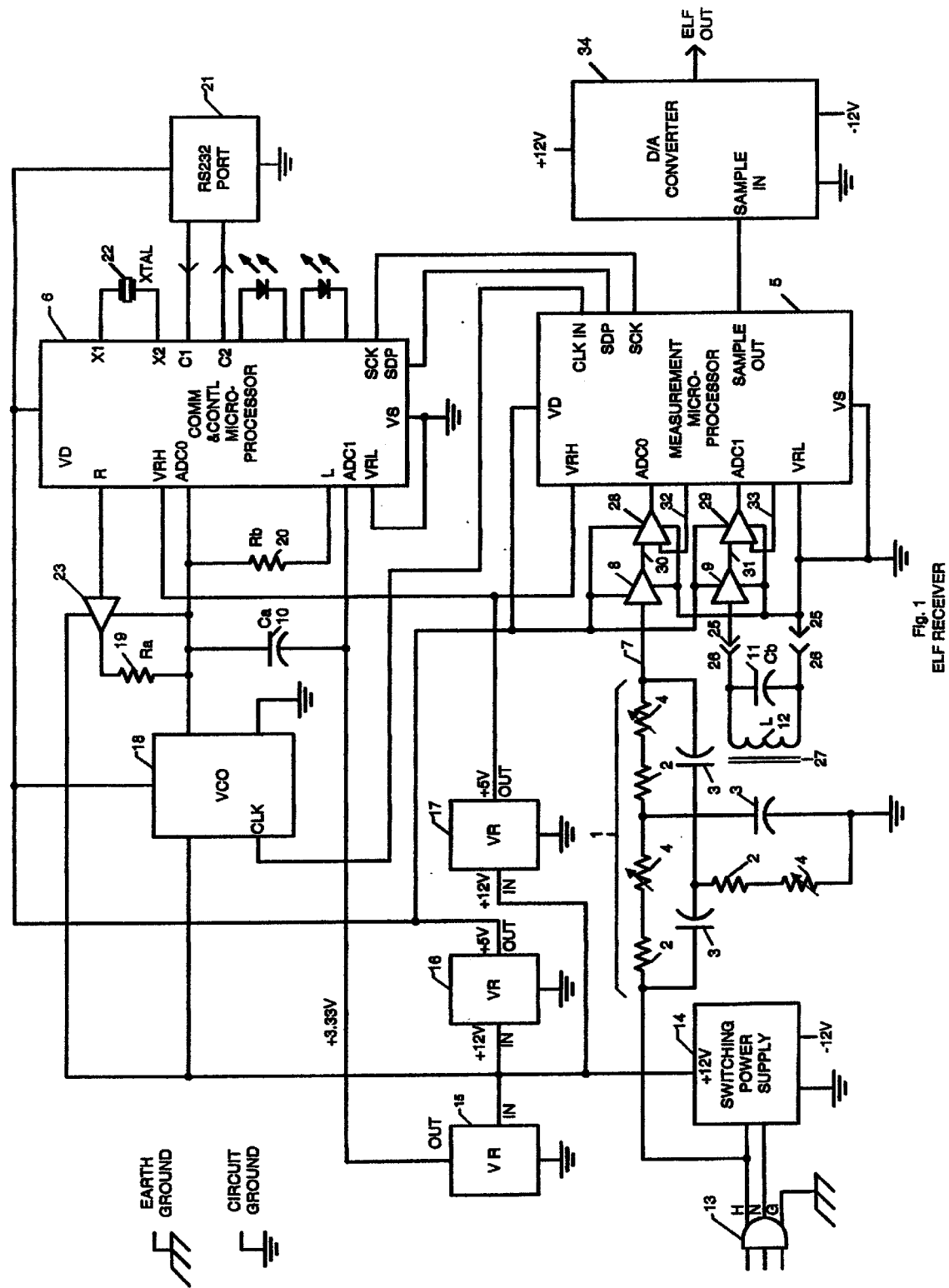

SYNCHRONOUS EXTREMELY LOW FREQUENCY (ELF) RECEIVER

This is a continuation in part of U.S. patent application Ser. No. 09/286,068 filed Apr. 5, 1999 entitled APPARATUS FOR OBTAINING WORLDWIDE DATA ON THE EARTH'S RESONANCE which in turn claimed the priority date of provisional application Serial No. 60/083315 filed on Apr. 28, 1998. The title has been changed.

PRIOR ART

No prior art receiver is known to utilize electric power lines to pick up the E component of the active TS frequency. No prior art receiver is known to use synchronous detection of Extremely Low Frequency (ELF) waves. The "New IEEE Standard Dictionary of Electrical and Electronics Terms", IEEE Standard 100 defines the ELF range as from 3 Hz to 30 kHz.

The active fundamental component of the Earth's resonance is continually excited at about 7.32 Hz by lightning discharges over the surface of the Earth. Herein this frequency is named the Tesla-Schumman (TS) frequency in honor of Tesla's work in Colorado Springs in 1899 in which he first recognized it and for W. O. Schumman's further work in Germany in the early 1960's.

SUMMARY OF INVENTION

An ELF receiver that operates at the 6 Hz to 9 Hz range to synchronously receive the TS and other signals of interest. The receiver operates on 105 to 240 Vac 50/60 Hz electric power. Signal voltages picked up by the electric power lines supplying the receiver provide a first input of the electric E component of the TS field at the geographical location of the receiver. A selectable alternate input is from a magnetic field pickup device consisting of an inductance wound on a bar of high permeability material so as to pick up an electrical output representing the magnetic H component of the TS field. The receiver also is useable to receive other signals of interest in the frequency band from 6 Hz to 9 Hz.

An analog output signal provides a real time noise free ELF wave representing any signal which an ELF receiver is tracking. Output in digital form is also provided.

BRIEF DESCRIPTION OF THE DRAWINGS

FIG. 1 A simplified schematic of a receiver for seeking, locking and tracking electric and magnetic field ELF waves from 6 Hz to 9 Hz.

REFERENCES

U.S. Pat. No. 5,544,064 "APPARATUS AND METHOD FOR SAMPLING SIGNALS SYNCHRONOUS WITH ANALOG TO DIGITAL CONVERTER" of Robert W. Beckwith the inventor herein. This patent is incorporated herein by reference.

DETAILED DESCRIPTION OF THE PREFERRED EMBODIMENTS

Synchronous receivers are used to receive television signals to prevent the picture from rolling should the phase lock loop, which maintains synchronism, fail to lock the receiver to the TV signal. Digital receivers of AM and FM signals, especially as used in automobile receivers, lock on to a signal.

The present ELF receiver uses a communications and control microprocessor 6 designated herein as mc6 operating at a fixed clock frequency of convenience to the design. Programs within mc6 search for, lock onto and track waves of interest by controlling voltages across a capacitor (Ca) 10. The voltage controlled oscillator (VCO) 18, of any suitable known type, responds to the voltage across Ca 10. VCO 18 generates a variable clock frequency for operation of a measurement microprocessor 5 herein designated as mp5. Through use of the variable clock controlled by mp6, mp5 seeks a frequency, locks onto the frequency and tracks variations in a frequency.

Microprocessor mp5, or any later version of Motorola HC11 processors, having an 8 bit analog to digital converter (ADC) using capacitors with a tolerance in the size of the capacitors. It is the proven experience with use of these microprocessors where many digital samples are integrated and averaged that an effective measurement of 11 bits resolution is realizable, also described in detail in the reference patent of the inventor herein.

To determine a desirable range of low frequencies for the inventive receiver to measure, consider the range of sub-harmonics of 50 and 60 cycle electric power systems.

TABLE 1

| For 60 Hz systems: | | For 50 Hz systems: | |
|---|---|---|---|
| Subharmonic | Frequency | Subharmonic | Frequency |
| 2 | 30 | 2 | 25 |
| 3 | 20 | 3 | 16.67 |
| 4 | 15 | 4 | 12.5 |
| 5 | 12 | 5 | 10 |
| 6 | 10 | 6 | 8.33 |
| 7 | 8.57 | 7 | 7.1429 |
| 8 | 7.5 | 8 | 6.25 |
| 9 | 6.17 | | |

Levels of subharmonic voltages to be expected on distribution lines that will be used to power the inventive TS receiver are not known. Capability to measure the six frequencies closest to the TS frequency, as shown in Table 1 extending from 6.25 Hz to 8.57 Hz, may also be of interest to users of the ELF receiver.

One interest will be in considering sub-harmonics of electric power equipment and effect of sub-harmonics on operation of such equipment.

Another will be by users interested on any modulation the sub-harmonics may produce on the ELF wave since the possibility exists for the electric network to couple energy back into the Earth's electromagnetic field. Note: the period of the TS wave is approximately equal to the circumference of the earth. A quarter wave is then equal to the distance from the equator to either pole of the earth or approximately 6200 miles. Since a single power distribution line is electrically short as compared to a quarter wave length, it is best to think of the power distribution line serving an ELF receiver as providing a sampling of the E field rather than of the power line being an antenna.

A preferable range for the receiver is therefore chosen from 6.0 Hz to 9.0 Hz. The present invention is illustrated hereinbelow for the 6 to 9 Hz range, however the invention is not limited to this range of illustration.

Referring to FIG. 1, a first purpose of this invention is to use electric power lines to pick up the electric (E) field of the desired signal. This signal is separated from the 60 Hz power frequency by a twin T filter 1.

Magnetic fields are picked up by a magnetic field H device consisting of inductance L12 wound on high permeability material 27 and resonated to 7.32 Hz by capacitor Cb 11 signal data from ADC1 can be processed using seeking, locking and tracking procedures as described herein for ADC0 inputs.

A physical twin T filter 1 is formed from resistors 2 and capacitors 3 having a very wide dynamic range as required to detect a wave using a large number of digital samples per half cycle of the wave. Any digital filter forming a notch or otherwise would add digital noise likely to exceed the magnitude of desired wave. Trim pots 4 are used to "tune" the twin T filter 1 for rejection of the 50 or 60 Hz power supply voltage thus compensating for tolerances in resistors 2 and capacitors 3.

Cross correlations are made in measurement microprocessor 5 (mp5) between digital samples from signals on connection 7 and tables of half waves of sine and cosine functions held in mp5 memory. Using the principles of the referenced patent of the present inventor, a large number of products of digital signal samples and values from the sine and cosine waves are used. Summing this large number of products provides a first selection of the desired wave from noise arising from the use of said digital samples as well as separation from undesired low frequency signals close to the frequency of the desired signal.

Cross correlation technology measures the magnitudes of fundamental components of desired waves without the use of Fourier transforms and the digital noise that would be introduced by use of that technology.

Cross correlation C is defined by equation 1 as:

$$C=(\Sigma(a \times b))^{1/2}/(\Sigma a^2+\Sigma b^2)^{1/2} \qquad 1.$$

Where C is a correlation number and "a" and "b" are functions each represented by a series of digital values. Herein "a"s are digital samples of the signal out of the twin T filter and "b"s are either values from a half wave sine function from 0 to 180° or from a half wave cosine function from −90° to +90°. Taking the square root of the numerator together with use of the denominator in the equation for C gives a normalized cross correlation with values for C going from −1 through 0 to +1. This is useful as a measure of the probability of the correlation being true. A value of +1 indicates a perfect noise free measurement, −1 indicates a match with a mirror image, and zero indicates a lack of correlation.

By using only the numerator of the equation for C and without taking the square root of the products of a and b equation 2 is obtained.

$$C=\Sigma(a \times b) \qquad 2.$$

Equation 2 is a measure of the amplitude of C.

Equations 3 and 4 are extensions of equation C used herein to obtain values for real, R, and quadrature, Q, components of a wave A.

$$R=\Sigma(s*t_{sin}) \qquad 3.$$

$$Q=\Sigma(s*t_{cos}) \qquad 4.$$

Where:
s is a digital sample of the wave, and
t is a one of a series of values of a sine or cosine function as indicated.

A fixed number of values is used for both the sine and cosine tables. A sum starts with the first value in a table and ends with the last sample. A sum of a fixed number of products thus gives a value for R or Q.

A preferred choice for mp5 is a Motorola 68HC11. The maximum rated clock frequency is 4.0 mHz. The 68HC11 uses a four phase operating system giving a 1.0 mHz maximum program operating E frequency Emax of 1.0 megabits per second. The period N between updates of analog to digital (ADC) result registers is 128 cycles of the E clock which operates the ADCs. Microprocessor 6 (mp6) controls the voltage from Ca 10 fed into VCO 18 which then supplies the clock frequency for mp5. The mp5 ADC will operate at its highest E clock rate of one mHz when measuring the highest ULF receiver input frequency of 9 Hz.

In accordance with the principles of the reference patent, the maximum number of ADC samples per second S is obtained from equation 5:

$$S=E \text{ max}/N=10^6/128=78,125. \qquad 5.$$

There are 18 half cycles per second of a 9 Hz wave, therefore the number of samples in a half cycle of measurement is 78,125/18=4340 cycles. This is then chosen as the number of samples in a sine table from zero to 180° and for a cosine table from −90° to +90° stored in mp5. At lower measured frequencies the mp5 clock frequency, controlled by mp6, is lower so that there are always 4340 samples per half cycle of any wave measured by the receiver. Appropriate clock frequencies are fed to mp5 CLK IN from VCO 18 to give an illustrative receiver range from 6 Hz to 9 Hz.

The voltage at ADC0 of mp6 corresponding to 9 Hz is arbitrarily set to 5 Vdc. The voltage at ADC1 of mp6 corresponding to 6 Hz is then ⅔ of 5 or 3.33 Vdc.

The mp5 clock is provided by VCO 18. The oscillator frequency is determined by a fixed inductor resonated with a varactor capacitor. The effective value of the varactor capacitor, in turn, is established by the voltage across capacitor Ca 10 plus a fixed 3.33 volts from voltage regulator 15. Internal components of VCO 18 are not shown.

The voltage across Ca 10 is raised by programming output R of mp6 high (ie to 5 Vdc) in a series of single one microsecond E clock cycles. Output R of mp6 is connected to op-amp 23 which then pulls pulses of current from +12 Vdc through resistor Ra 14 into Ca 10 for one microsecond. The voltage across capacitor Ca 10 is lowered by pulling current through resistor Rb 20 directly through mp6 to ground in one microsecond pulses. Various desired changes in the voltage across Ca 10 are obtained by a sequence of current pulses through Ra 19 and Rb 20. The resolution, ie the steps of change in voltage across Ca, is determined by choices in the values of Ra 19, Rb 20 and Ca 10.

This process results in TS received frequencies being linearly related to voltage across Ca 10 as measured by ADC inputs ADC0 and ADC1 of mp6. Once the TS receiver is locked on a received signal, the received frequency can be quickly determined by an interpolation between the voltages measured at ADC0 and ADC1 of mp6. Internal scaling factors are formed in mp6 by inputting known frequencies of 6 and 9 Hz via input socket 25 with magnetic pickup L 12 removed thus compensating for tolerances in the ELF receiver component values.

Voltage regulator 15 inserts 3.333 volts into ADC1 of mp6. This is used by a program in mp6 to establish the lowest frequency the TS receiver will receive and the lowest voltage across Ca 10.

The output on connection 7 of the twin T filter 1 is passed through an operational amplifier (op-amp) 8 biasing the DC level of the ELF wave 2.5 volts to the center point of the 5 volt range of the ADC input ADC0 provided by mp5. Said biasing allows measuring both the positive and negative half cycles of the ELF wave, ie the whole cycle. The op-amp 8 also provides a very high impedance burden for the twin T filter 1 which is required to obtain a sharp filtering notch for rejecting the 50 or 60 Hz wave.

Note that mp5 ADC0 inputs are always a positive value starting at zero. When the samples are of the positive half cycle of a wave that each sample is the amplitude of the wave plus 2.5 volts. Thus the sum of the products is an amplitude R and Q of the positive half cycle plus 2.5 volts. When measuring a negative half cycle the absolute positive magnitude of the negative half cycle is the sum of the samples less 2.5 volts. When average values of the waves are computed, the 2.5 volts cancels and can therefore be ignored.

A typical sequence of steps of a synchronous measurement program operating in mp5 for measuring the magnitude of E is as follows:

Step 1 obtain a sample from ADC0
2 multiply the sample by the first sample in the sine table
3 multiply the sample by the first sample in the cosine table
4 initiate sums of both products
5 count the samples used
6 selectively send a sample from the sine table to D/A converter 34.
7 have 4340 samples been used? If so communicate the two sums to mp6 and return to step 1, if not:
8 step through do-nothing steps (the number of do-nothing steps precomputed for a total number of clock cycles of 128)
9 return to step 1.

The process for measuring the magnitude of the H component, with inductive pickup L 12 plugged into socket 25, is the same except that signal samples are taken from mp5 input ADC1.

The 8 bit ADC in mp5 has a range of 256 which is reduced to 128 for either positive or negative half cycles of the TS wave by the 2.5 volt bias. This value of 128, however is likely far above the signal to noise ratio of the TS wave and therefore adds an insignificant amount of digital noise to the noise already there.

In order to provide best low signal reception, it is desirable to utilize the full range of the ADCs from zero to five volts. Variable gain amplifiers (VGA) 28 and VGA 29 are therefore used to amplify signals into ADC0 and ADC1 of mp5. Leads 30 provides input to VGA 28 from op-amp 8. The output of VGA 28 is connected to ADC0 of mp5. When the measurement program in mp5 finds less than, say 8, samples with a saturated value from the ADC0 a gain control signal return 32 from mp5 to VGA 28 increases the gain. When the count is greater than the chosen threshold, say 8, the gain return signal is reduced. These corrections in gain occur at the end of each half cycle of measurement depending on the saturation count during the previous cycle. In this way the receiver continually adapts to the most sensitive gain setting.

A Motorola 68HC16Z2 or later improved versions thereof is preferred for mp6 since it provides programming capability in combinations of higher level language C and machine language. Alternatively a Motorola 68HC11 is used.

Capacitor Ca 10 holds a portion of the voltage converted to a clock frequency for mp5 by VCO 18. A regulated voltage of 3.33 Vdc from voltage regulator 5 supplies the remainder. A 5 Vdc sum consisting of the maximum voltage across capacitor 10 of 1.66 Vdc plus the regulated dc voltage of 3.33 results in a clock frequency to mp5 which produces a frequency measurement of 9 Hz. With the voltage across capacitor Ca 10 at zero, the regulated voltage of 3.333 alone produces a measurement of 6 Hz.

When mp6 causes current pulses to flow through resistor Ra 14 to +12 Vdc, the capacitor Ca 10 charge voltage is increased. When mp6 causes pulses of current to flow through resistor Rb to L of mp6 and thus to ground, the charge voltage across capacitor Ca 10 is reduced. The current pulses through R and L are maintained until the desired voltage measured by ADC input ADC0 is reached. Changes in voltage at ADC0 can be slued at desirable rates. The minimum step change (resolution) in clock frequency to mp5 is minimized thus providing smooth seeking, locking and tracking of frequencies in the range from 6 to 9 Hz.

Based on calculations in mp6 after half cycle correlation sums R and Q are completed, mp6 corrects the mp5 clock frequency to correct measurement errors in the previous half cycle. These errors are calculated in somewhat different fashion as operation progresses through phases somewhat related to servo systems:

Seeking. In this step a first estimate of the ELF frequency is used as translated to the mp5 clock frequency as described above. The mp5 clock frequency is moved until the receiver is locked in frequency to the desired signal out of the twin T filter. This is determined in mp6 by a program that finds that the Q component of phaser A no longer rotates in value from one polarity through zero to the opposite polarity.

Phase Locking. In this step the mp5 clock frequency is moved so as to rotate the phase angle between the P and Q components seeking to reduce the angle. The value of Q is held close to zero with errors from zero measured after each half cycle. A number of mp5 clock correction pulses are calculated sufficient to correct the Q error. These are sent from mp6 outputs R or L as required at the start of the next half cycle.

Tracking. After phase locking the receiver continues to track the desired wave. It is believed that the TS frequency will vary somewhat with time. Thus it is expected that corrections in phase of phaser A will continuously vary when tracking the TS frequency, If phase and frequency lock are not accomplished within a settable time, operation restarts at phase 1 with a modified first estimate of TS frequency. In somewhat more detail, a method of operation is as follows:

A method of using microprocessors in a synchronous receiver for Extremely Low Frequency (ELF) wave receivers consists of the steps of varying clock frequencies in a first of said microprocessors, controlling said clock frequencies by a second of the microprocessors, and producing synchronization of the clock frequencies with desired ELF frequencies.

The method consists of the further steps of powering said ELF receivers from distribution power lines, and picking up electric field signals of ELF waves from the power lines.

The method consists of the further steps of including tables of selected numbers of values of sine functions from 0 to 180° in the first of the microprocessors, connecting the electric field signals of ELF waves to analog to digital converters (ADCs) in the first microprocessor, taking digital samples in the first of the microprocessors, multiplying the digital samples by values of the tables of sine functions to obtain products, summing the products for all of the selected number of values to obtain the R component of the ELF wave, and seeking the R component by varying the clock frequency.

The method consisting of the further steps of including tables of selected numbers of values of cosine functions from −90° to +90° in the first microprocessors, connecting the electric field signals of ELF waves to analog to digital converters (ADCs) in the first microprocessor, taking digital samples in the first of the microprocessors, multiplying the digital samples by values of the tables of cosine functions to obtain products, summing the products for all of the selected number of values to obtain the Q component of the wave, and locking on the ELF wave by varying the clock frequency so as to reduce the Q component towards zero.

The method further consists of tracking the ELF wave by further varying the clock frequency so as to hold said Q component close to zero as said ELF wave frequency varies.

Recursive averages of the value of R and Q are then computed in communications and control mp6, further improving the signal to noise ratio of the measure of R and Q. At least two recursive averages will be used simultaneously. A fast one is most likely to detect Q bursts which are said to be transitory with longer averages tracking the TS wave itself.

FIG. 1 shows electric power plug 13 receiving the hot H, neutral N and ground G connections from a power line when plugged into an electric power receptacle. The circuit ground for the ELF receiver as shown by various circuit ground symbol connections. Switching power supply 14 develops a 12 Vdc general supply used by voltage regulators 15, 16 and 17 as well as Voltage Controlled Oscillator (VCO) 18. this switching power supply isolates the circuit ground from the earth ground of the electric power plug 13. This permits the RS232 port 21 to be connected to a computer ground which may be isolated for transient protection from the earth ground of the electric power service supplying the ELF receiver. Regulator 15 provides 3.33 Vdc to VCO 18, regulator 16 provides a general supply of 5 Vdc for op-amps 8 and 9, variable gain amplifiers (VGA) 28 and 29, and for mp5 and mp6. Regulator 17 provides a highly accurate 5 Vdc reference for mp5 and mp6 ADCs. Switching power supply 14 contains a transformer providing isolation from earth ground from electronic circuit grounds. Twin T filter 1 input is connected to H and earth ground G wires from power plug 13 and thus to the electric power supply lines and ground. Twin T filter 1 consists of three resistors 2, three capacitors 3 and three trim-pots 4. Twin T 1 output on connector 7 is input to op-amp 8.

Signals on conductor 7 from twin T filter 1 are raised 2.5 volts dc by op-amp 8 and connected by conductor 30 to the input of VGA 28. The output of VGA 28 is connected to ADC input ADC0 of mp5. A gain control output from mp5 is connected by conductor 32 to the gain control input of VGA 28.

Drain supply VD for mp5 is 5 Vdc from regulator 16 and source VS is connected to ground. VCO 18 CLK supplies the clock frequency signal to input CLK IN of mp5. Low ADC voltage references VRL are connected to ground for both mp5 and mp6.

VCO 18 receives a 12 Vdc supply from switching power supply 14 with a circuit ground connection as shown and a connection to the high side of capacitor Ca 10 and ADC0 of mp6. The low side of capacitor Ca 10 is connected to voltage +3.33V. Resistor Ra 19 is connected between said high side of Ca 10 and the output of switching op-amp 23. Switching op-amp 23 is supplied with +12 Vdc from switching power supply 14 with return connected to said high side of Ca 10 thus effectively pulling current up from Ca 10 when op-amp input connected to mp6 R is at a high (5 Vdc) state. Resistor Rb 20 is connected between said high side of Ca 10 and lower terminal L of mp6 and pulls current down from Ca 10 when mp6 L is in the low or ground state. Said high side of Ca 10 is connected to ADC input ADC0 of mp6. Said low side of Ca 10 is connected to ADC input ADC1 of mp6. Source VS of mp6 is connected to ground and drain VD is connected to 5 Vdc from VR 16. Clock crystal 22 is connected between mp6 terminals X1 and X2. RS232 port 21 receives data from terminal C2 of mp6 and sends data to terminal C1 of mp6. Port 21 is powered by a connection to +5 Vdc from regulator 16 and a connection to ground. Data is exchanged between mp5 and mp6 at any difference in clock frequency by a bidirectional data connection from SDP of mp5 to SDP of mp6 together with a bidirectional clock connection from SCK of mp5 to SCK of mp6. The directions of data signals and clock signals are always in agreement.

Magnetic field H pickup device 27 containing inductance L 12 and capacitance Cb 11 is connected into socket 25 by plug 26. Said pickup device 27 is resonated at 7.32 Hz by capacitor Cb 11 connected in parallel with inductance L 12. Device 27 socket 25 is connected between op-amp 9 input and ground. Signals from device 27 are raised 2.5 volts dc by op-amp 9 and connected by conductor 31 to the input of VGA 29. The output of VGA 29 is connected to ADC input ADC1 of mp5. A gain control output from mp5 is connected by conductor 33 to the gain control input of VGA 29.

In the process of computing cross correlations of received signals by mp5, selected ones of the 4340 values of a sine wave are sent by mp5 SAMPLE OUT terminal to the SAMPLE IN terminal of D/A converter 34. The number of samples selected is sufficient to provide a useable distortion free real time ELF wave out duplicating any received signal to which the ELF receiver is locked and tracking. Alternatively a user of the receiver can request digital data be brought through D/A converter 34 and to the ELF OUT port for use in applications where digital data is more useable.

A user interface program is provided which is operable in a conventional external computer such as a lap-top or desk-top, not shown. The user computer connects to the ELF receiver through port 21 allowing usage in ways familiar for commonly available receivers.

Advantages of the Invention
1. Portable and light weight.
2. Available to many interested parties because of its low cost.
3. User friendly.
4. Accurate due to use of synchronous techniques.
5. Useable anywhere electric power is available.
6. Safe to use.

While the invention has been particularly shown and described with reference to preferred embodiments thereof, it will be understood by those skilled in the art that various changes in form and in details may be made therein without departing from the spirit and scope of the invention.

I claim:

1. A method of using microprocessors in a synchronous receiver for Extremely Low Frequency (ELF) wave receivers consisting of the steps of:
   a) varying clock frequencies in a first of said microprocessors,
   b) controlling said clock frequencies by a second of said microprocessors, and
   c) producing synchronization of said clock frequencies with desired ELF frequencies.

2. A method as in claim 1 consisting of the further steps of:
   a) powering said ELF receivers from distribution power lines, and
   b) picking up electric field signals of ELF waves from said powering lines.

3. A method as in claim 2 consisting of the further steps of:
   a) including tables of selected numbers of digital values of sine functions from 0 to 180° in said first microprocessors, b) connecting said electric field signals of ELF waves to analog to digital converters (ADCs) in said first microprocessor,
c) taking digital samples in said first of the microprocessors,
d) multiplying said digital samples by values of said tables of sine functions to obtain products,
e) summing said products for all of said selected number of values to obtain the R component of said ELF wave.
f) seeking said R component by varying said clock frequency.

4. A method as in claim 2 consisting of the further steps of:
a) including tables of selected numbers of digital values of cosine functions from −90° to +90° in said first microprocessors,
b) connecting said electric field signals of ELF waves to analog to digital converters (ADCs) in said first microprocessor,
c) taking digital samples in said first of the microprocessors,
d) multiplying said digital samples by values of said tables of cosine functions to obtain products,
e) summing said products for all of said selected number of values to obtain the Q component of said wave,
f) locking on said ELF wave by varying said clock frequency so as to reduce said Q component towards zero, and
g) tracking said ELF wave by further varying said clock frequency so as to hold said Q component close to zero as said ELF wave frequency varies.

5. A method as in claim 2 consisting of the further steps of:
a) offsetting input voltages to the center of the voltage range of the ADCs,
b) connecting input voltages through variable gain amplifiers to said ADCs, and
c) feeding gain control signals from said second microprocessors to said first microprocessors so as to optimize the gain of said variable gain amplifiers and obtain full amplification of ELF waves with minimal flattening of the waves.

6. A method as in claim 5 consisting of the further steps of:
a) obtaining voltages between the hot and the ground terminals of ELF receiver power lines, and
b) passing said voltages through twin T filters so as to remove the fundamental component of the power supply voltage.

7. A method as in claim 4 consisting of the further steps of:
a) outputting said digital values of sine and cosine functions as they are used in time to digital to analog converters (DACs),
b) said DACs outputting distortion free analog signals in time synchronization with R and Q components of the ELF wave, and
c) suppressing said outputs when the ELF receiver is not locked to a signal.

8. A method as in claim 6 consisting of the further step of outputting said digital values of sine and cosine wave functions in place of said analog signals from said D/A converter.

9. A method as in claim 1 consisting of the further step of picking up magnetic field signals of ELF waves from a magnetic field pickup device.

10. A method as in claim 9 consisting of the further steps of:
a) including tables of selected numbers of digital values of sine functions from 0 to 180° in said first microprocessors,
b) connecting said magnetic field signals of ELF waves to analog to digital converters (ADCs) in said first microprocessor,
c) taking digital samples os said signals in said first of the microprocessors,
d) multiplying said digital samples by values of said tables of sine functions to obtain products,
e) summing said products for all of said selected number of values to obtain the R component of said ELF wave,
f) seeking said R component by varying said clock frequency.

11. A method as in claim 9 consisting of the further steps of:
a) including tables of selected numbers of digital values of cosine functions from −90° to +90° in said first microprocessors,
b) connecting said magnetic field signals of ELF waves to analog to digital converters (ADCs) in said first microprocessor,
c) taking digital samples os said signals in said first of the microprocessors,
d) multiplying said digital samples by values of said tables of cosine functions to obtain products,
e) summing said products for all of said selected number of values to obtain the Q component of said wave,
f) locking on said ELF wave by varying said clock frequency so as to reduce said Q component towards zero, and
g) tracking said ELF wave by further varying said clock frequency so as to hold said Q component close to zero as said ELF wave frequency varies.

12. A method as in claim 9 consisting of the further steps of:
a) offsetting input voltages to the center of the voltage range of the ADCs,
b) connecting input voltages through variable gain amplifiers to said ADCs, and
c) feeding gain control signals from said second microprocessors to said first microprocessors so as to optimize the gain of said variable gain amplifiers and obtain full amplification of ELF waves with minimal flattening of the waves.

13. A method as in claim 11 consisting of the further steps of:
a) outputting said digital values of sine and cosine functions as they are used in time to digital to analog converters (DACs),
b) said DACs outputting distortion free analog signals in time synchronization with R and Q components of the ELF wave, and
c) suppressing said outputs when the ELF receiver is not locked to a signal.

14. A method as in claim 13 consisting of the further step of outputting said digital values of sine and cosine wave functions in place of said analog signals from said D/A converter.

* * * * *